Figure 1:
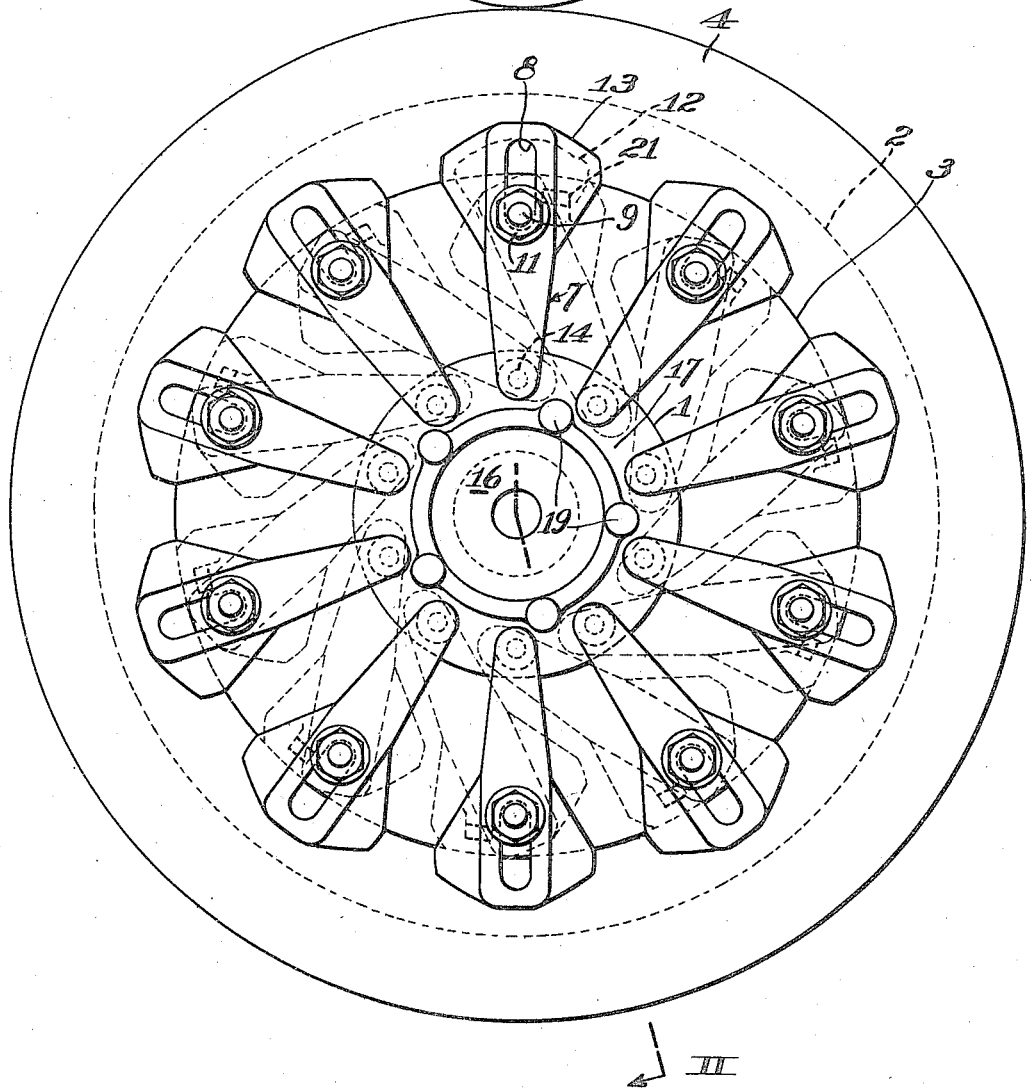

Feb. 18, 1936.  F. C. BIGGERT, JR  2,031,246
ROTARY SHEAR BLADE CLAMP
Filed Nov. 19, 1935  2 Sheets-Sheet 1

WITNESSES
A. B. Wallace.
V. A. Peckham.

INVENTOR.
Florence C. Biggert, Jr.
BY Brown, Critchlow & Flick
his ATTORNEYS.

Feb. 18, 1936.    F. C. BIGGERT, JR    2,031,246
ROTARY SHEAR BLADE CLAMP
Filed Nov. 19, 1935    2 Sheets-Sheet 2
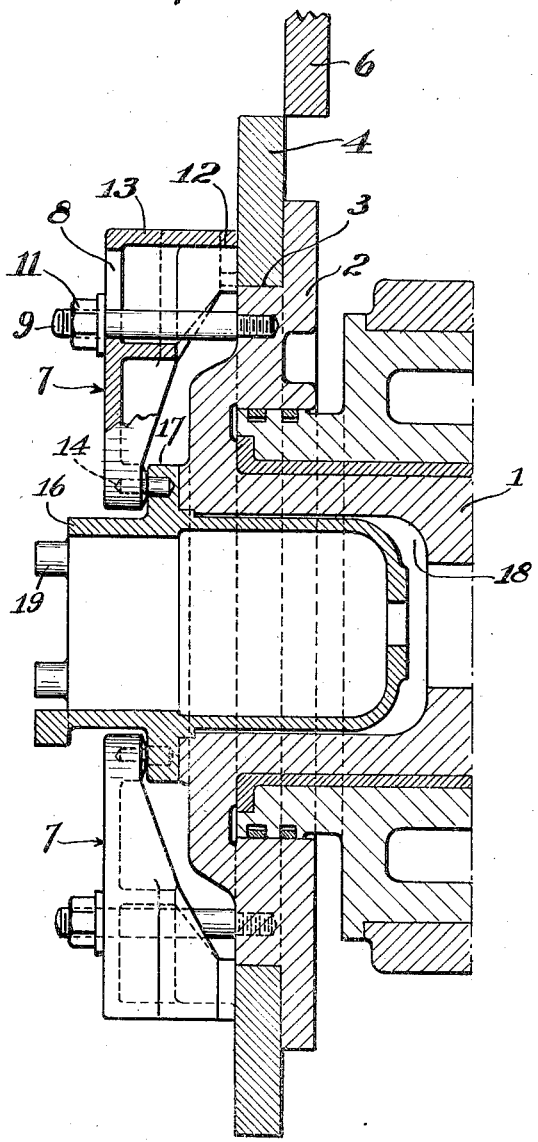
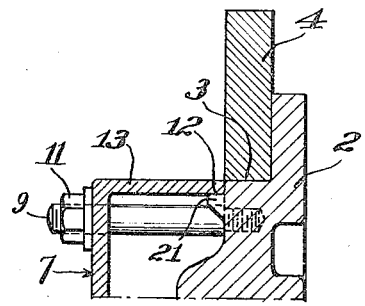
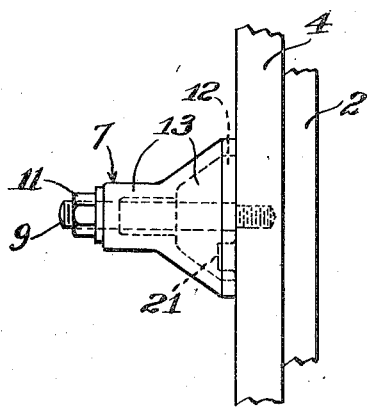
WITNESSES
A B Wallace.
V. A. Peckham.
INVENTOR.
Florence C. Biggert, Jr
BY Brown, Critchlow & Flick
his ATTORNEYS.

Patented Feb. 18, 1936

2,031,246

UNITED STATES PATENT OFFICE 2,031,246

ROTARY SHEAR BLADE CLAMP

Florence C. Biggert, Jr., Crafton, Pa., assignor to United Engineering & Foundry Company, Pittsburgh, Pa., a corporation of Pennsylvania Application November 19, 1935, Serial No. 50,563

8 Claims. (Cl. 164—60)

This invention relates to rotary shearing apparatus for trimming the edges of metal plates, and more particularly to means for detachably clamping annular shear blades to their rotating supports in such apparatus.

Heretofore, as shown in Fig. 10 of Patent No. 1,819,635 to Biggert and Johnson, it has been the practice to clamp the large annular blades, of shearing apparatus of the type referred to above, to their rotating supports by means of heavy blade-engaging rings that are bolted to the supports. When it is desired to remove such a blade for sharpening or replacement, the nuts must first be removed from the bolts and then the clamping ring removed from the bolts by means of an overhead crane or the like. The blade is then pulled away from its seat across the uppermost bolts which may thereby be bent or damaged.

It is among the objects of this invention to provide means for detachably clamping an annular blade to a rotatable support which permits the removal of the blade without itself being removed from the support, which is readily disengaged from the blade to release it, and which supports the blade as it is being removed.

The preferred embodiment is illustrated in the accompanying drawings in which Fig. 1 is a side view of an annular blade of rotary shearing apparatus with the blade-clamping means in clamping position; Fig. 2 is a vertical section taken on the line II—II of Fig. 1; Fig. 3 is a fragmentary vertical section showing part of the clamping means disengaged from the blade; and Fig. 4 is an end view of one of the clamping fingers.

Referring to Fig. 2 of the drawings, projecting from one side of rotary edge trimming apparatus of the type shown in the above-mentioned Patent No. 1,819,635 is one end of a rotatable support or shaft 1 encircled by an integral radial flange 2, the outer face of which is provided with an annular shoulder 3 spaced inwardly from the periphery of the flange. Removably seated on this shoulder is an annular shear blade 4 which cooperates with a smaller annular blade 6 above it in trimming one edge of metal plates.

It is a feature of this invention that the large lower blade 4 is normally retained on its seat by clamping means comprising a plurality of clamping fingers 7 disposed adjacent the outer face of the flange, preferably radially thereof as shown in Fig. 1, with their outer ends overlapping the inner portion of the blade. Extending lengthwise of each of the fingers in the outer portion thereof is a slot 8 through the inner end of which a stud bolt 9 extends. The inner end of the bolt is threaded in flange 2 and the outer end is provided with a nut 11 for drawing the outer end of the finger up tightly against the blade which is thereby clamped between the finger and the portion of the flange beyond shoulder 3. The blade-engaging portion of the finger is recessed to form a substantially curved inner end wall 12.

To permit all of the fingers to be simultaneously withdrawn from engagement with the blade, their inner ends are pivotally connected to a cylindrical hub 16, coaxial with shaft 1, by pins 14 extending laterally into a radial flange 17 encircling the outer portion of the hub. The hub is rotatable relative to the shaft which is provided in its end with a cylindrical recess 18 in which the inner portion of the hub is rotatably disposed.

When it is desired to remove blade 4 from its seat, the nuts on the ends of the stud bolts are loosened sufficiently to permit the clamping fingers to slide thereon, and then hub 16 is rotated relative to shaft 1 such as by a wrench or bar-engaging lugs 19 projecting from the outer end of the hub. Rotation of the hub moves the inner ends of the fingers pivoted thereto circumferentially relative to the stud bolts, whereby the outer ends of the fingers are drawn inwardly toward the hub, as shown in dotted lines in Fig. 1. The bolt-receiving slots in the fingers are long enough to permit the fingers to move inwardly far enough to free their outer ends from the blade which can then be moved axially from its seat over the ends of the fingers. The outer end walls 13 of the fingers have the same curvature as seat 3, whereby they form an extension of the seat when they are in retracted position.

To relieve the uppermost stud bolts from the weight of the blade as it is slid across the fingers, radial flange 2 is preferably provided adjacent each bolt with a laterally projecting lug 21 which is engaged by end wall 12 of the adjacent finger when in its retracted position, as shown in Fig. 3. Thus, the uppermost lugs, instead of the adjacent bolts, take the weight of the blade. When a blade has been reseated on annular shoulder 3 it is quickly clamped in place by merely turning hub 16 back to its normal position to move the outer ends of the clamping fingers outwardly into overlapping engagement with the blade, whereupon nuts 11 are tightened on the bolts to hold the fingers tightly in place.

A blade-clamping means constructed in accordance with this invention is quickly engaged with and disengaged from an annular blade because no part of it is entirely removed from the rotatable blade-carrying shaft. It is therefore unnecessary to employ a crane or other means to remove the clamping means. Furthermore, there is no danger of bending the stud bolts under the weight of a blade being removed from its seat, because that weight is supported by the clamping fingers through the uppermost lugs on the side of the shaft flange.

According to the provisions of the patent statutes, I have explained the principle and mode of operation of my invention and have illustrated and described what I now consider to represent its best embodiment. However, I desire to have it understood that within the scope of the appended claims, the invention may be practiced otherwise than as specifically illustrated and described.

I claim:

1. In rotary shearing apparatus, the combination of a rotatable support having a radial face provided with a seat for an annular blade, an annular blade mounted on said seat, a plurality of clamping fingers disposed adjacent said face of said support with their outer ends overlapping said blade, and fastening means connected to said fingers for clamping the blade on the seat, the outer ends of said fingers being movable inwardly to free them from said blade whereby to permit the blade to be removed from said seat.

2. In rotary shearing apparatus, the combination of a rotatable shaft having a radial face provided with a seat for an annular blade, an annular blade mounted on said seat, a plurality of clamping fingers disposed adjacent said face of said shaft with their outer ends overlapping said blade, and a fastening member extending loosely through each of said fingers for clamping the blade on the seat, and means for simultaneously moving the outer ends of all of said fingers inwardly to free them from said blade whereby to permit the blade to be removed from said seat.

3. In rotary shearing apparatus, the combination of a rotatable shaft having a radial face provided with a seat for an annular blade, an annular blade mounted on said seat, a plurality of clamping fingers disposed adjacent said face of said shaft with their outer ends overlapping said blade, each of said fingers being provided with a slot extending longitudinally thereof, and a fastening member extending through each of said slots and connecting the adjoining finger to said shaft for clamping the blade on the seat, said outer ends of the fingers being movable inwardly to free them from said blade whereby to permit the blade to be removed from said seat.

4. In rotary shearing apparatus, the combination of a rotatable shaft having a radial face provided with a seat for an annular blade, an annnular blade mounted on said seat, a plurality of clamping fingers disposed radially of said face of said shaft with their outer ends overlapping said blade, each of said fingers being provided with a radial slot, a fastening member extending through each of said slots and connecting the adjoining finger to said shaft for clamping the blade on the seat, and means for simultaneously sliding all of said fingers inwardly on said fastening members to free their outer ends from said blade.

5. In rotary shearing apparatus, the combination of a rotatable shaft having a radial face provided with a seat for an annular blade, an annular blade mounted on said seat, a plurality of clamping fingers disposed radially of said face of said shaft with their outer ends overlapping said blade, each of said fingers being provided with a radial slot, a fastening member extending through each of said slots and connecting the adjoining finger to said shaft for clamping the blade on the seat, and means pivotally connected to the inner ends of said fingers and rotatable relative to said shaft for simultaneously retracting all of the fingers to free their outer ends from said blade.

6. In rotary shearing apparatus, the combination of a rotatable shaft having a radial flange provided with a seat for an annular blade, an annular blade mounted on said seat, a plurality of clamping fingers disposed radially of said flange with their outer ends overlapping said blade, each of said fingers being provided with a radial slot, a fastening member extending through each of said slots and connecting the adjoining finger to said flange for clamping the blade on the seat, and means pivotally connected to the inner ends of said fingers and rotatable relative to said shaft for simultaneously drawing all of the fingers inwardly relative to said fastening members to free their outer ends from said blade, said flange being provided with means for supporting the outer ends of the fingers when they are withdrawn from the blade whereby the uppermost fastening members are relieved of weight on the adjoining fingers.

7. In rotary shearing apparatus, the combination of a rotatable shaft having a circumferential radial flange provided with an annular shoulder forming a seat for an annular blade, an annular blade mounted on said shoulder with its inner face engaging said flange, a plurality of clamping fingers disposed radially of said flange with their outer ends overlapping said blade, each of said fingers being provided with a radial slot, a bolt extending through the inner end of each of said slots and connecting the adjoining finger to said flange for clamping the blade thereon, a member disposed adjacent the inner ends of said fingers and adapted to be rotated relative to said shaft, and means for pivotally connecting the inner ends of the fingers to said member whereby when said member is rotated relative to said shaft the outer ends of the fingers are drawn inwardly on said bolts to free them from said blade, said flange being provided with a plurality of laterally projecting lugs adjacent said bolts for supporting the outer ends of the fingers when they are withdrawn from the blade.

8. In combination with an arbor having a seat for the reception of a rotary cutting element or the like, means for clamping said element to said arbor, and means for retracting said clamping means from clamping to unclamping position, said clamping means constituting an extension of said seat when in its retracted position.

FLORENCE C. BIGGERT, Jr.